United States Patent [19]
Cunard et al.

[11] Patent Number: 5,364,312
[45] Date of Patent: Nov. 15, 1994

[54] PLAY GYM CONSTRUCTION

[75] Inventors: Joel C. Cunard; Robert J. Boudreau; William H. Ziegler, Jr., all of Bedford, Pa.

[73] Assignee: Hedstrom Corporation, Bedford, Pa.

[21] Appl. No.: 18,867

[22] Filed: Feb. 17, 1993

[51] Int. Cl.$^5$ ............................................. A63G 9/00
[52] U.S. Cl. .................................. 472/118; 403/403; 403/217; 52/696; 52/712; 182/181; 182/153; 182/224
[58] Field of Search ............... 472/118; 403/217, 403, 403/231; 248/163.1, 188, 300; 52/696, 712; 182/153, 155, 181, 185, 224

[56] References Cited

U.S. PATENT DOCUMENTS

| | | | |
|---|---|---|---|
| 1,116,240 | 11/1914 | Canfield | 403/217 |
| 1,719,440 | 7/1929 | Nathan | 182/181 |
| 2,194,027 | 3/1940 | McDonald | 182/129 |
| 2,376,153 | 5/1945 | Karow | 182/185 |
| 2,505,532 | 4/1950 | Ernst | 182/181 |
| 2,638,386 | 5/1953 | Larson | 182/181 |
| 2,889,176 | 6/1959 | Thompson | 403/217 |
| 3,480,111 | 11/1969 | Larson | 182/181 |
| 3,627,075 | 12/1971 | Enders | 182/84 |
| 3,636,894 | 1/1972 | Hage | 248/188 |
| 3,730,464 | 5/1973 | Kelly | 248/300 |
| 3,854,268 | 12/1974 | Gutner | 403/403 |
| 4,966,309 | 10/1990 | Baer | 472/118 |
| 5,016,873 | 5/1991 | Bossa | 472/118 |
| 5,170,861 | 12/1992 | Turner | 182/153 |

Primary Examiner—Carl D. Friedman
Assistant Examiner—Winnie Yip
Attorney, Agent, or Firm—Cesari and McKenna

[57] ABSTRACT

A kit for assembling wood legs to form an A-frame to support the end of a cross beam for a children's play gym includes a trapezoidal frame bracket to connect the upper ends of the legs to each other and to the cross beam and a special frame brace for reinforcing that connection which will accommodate a tubular metal cross beam or a cross beam consisting of a single board or a plurality of boards. The frame brace has a generally rectangular top wall and a pair of laterally spaced apart side walls extending down from the top wall at an angle such that the side walls have more or less the same slope as the side edges of the frame bracket. Portions of the frame brace top wall define a first set of holes spaced apart along the longitudinal centerline of the top wall, there being two such holes in the first set and a second set of holes containing at least two holes spaced along the top wall on each side of that centerline. There also may be a third set of holes containing at least two holes spaced along the top wall on each side of the centerline and being displaced from the second set of holes. The kit also includes fasteners arranged to extend through the first set of holes into the cross beam when the cross beam is a unitary member and through the second and third sets of holes into the cross beam when the cross beam is of wood so that the same hardware can be used to construct play gyms having a variety of different type cross beams.

15 Claims, 2 Drawing Sheets

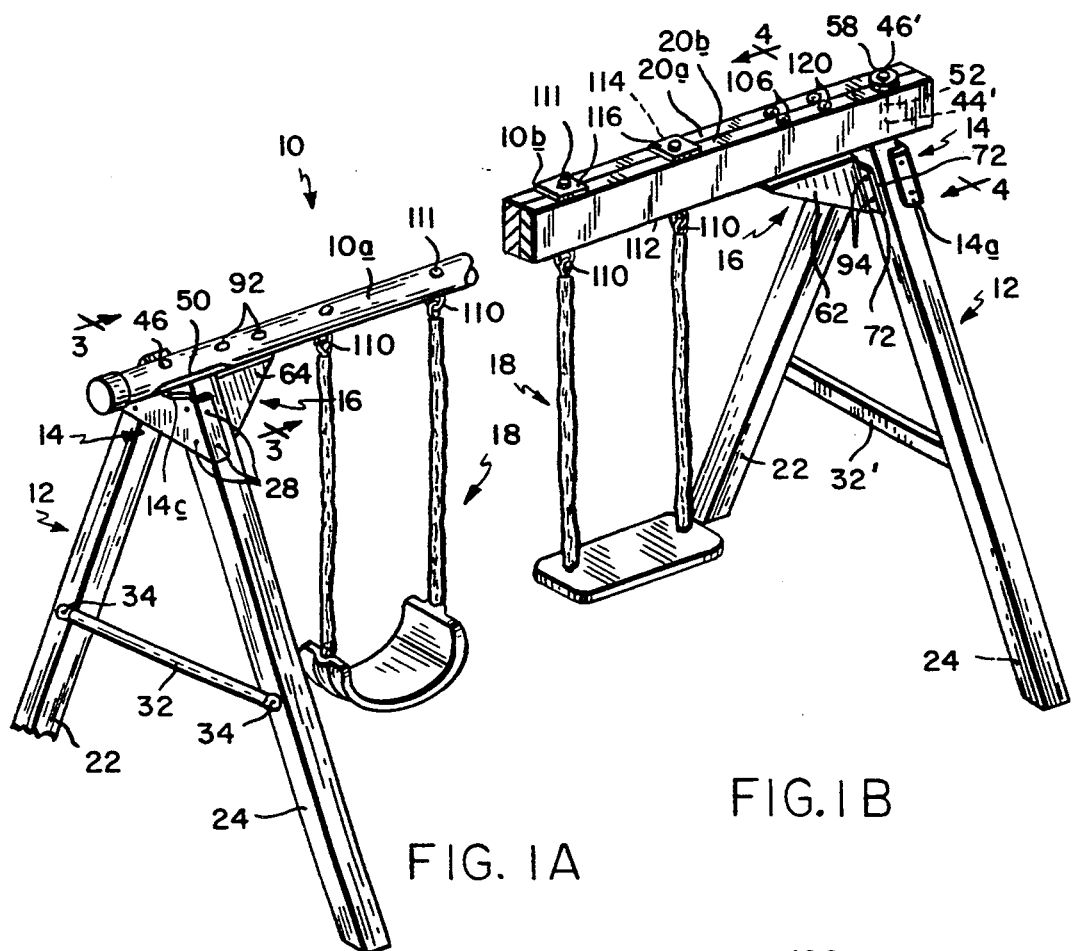
FIG. 1A
FIG. 1B
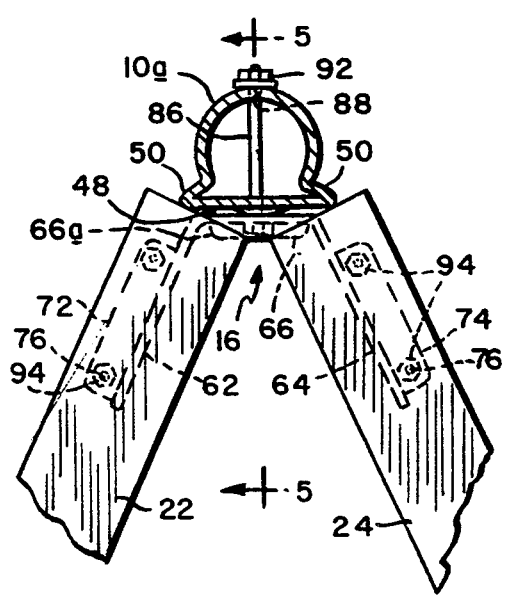
FIG. 3
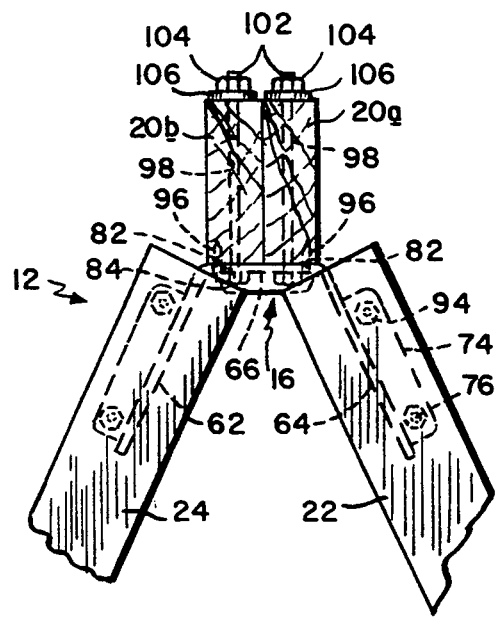
FIG. 4

PLAY GYM CONSTRUCTION

FIELD OF THE INVENTION

This invention relates to a children's play gym. It relates more particularly to a hardware kit for constructing a children's play gym made mostly of wood.

BACKGROUND OF THE INVENTION

A children's play gym usually comprises a cross beam supported horizontally above the ground by A-frames connected by various types of brackets and braces to the opposite ends of the cross beam. Swings and other rides are suspended from the cross beam. Typically, all of the major components of the play gym, including the cross beam, the legs comprising the A-frames and the hardware for assembling those parts are made of metal. However, there is also a strong demand for play equipment of this type whose cross beams and legs consist of wood planks or timbers. These wood members give the play gym an especially strong and stable overall appearance which is important to and appreciated by some consumers.

In order to minimize shipping costs, manufacturers usually sell such wood gym sets in the form of a kit having all of the parts required for the play gym except the wood components thereof. It is left to the purchaser of the kit to acquire the wood members from a local lumber yard. These wood members usually include two 4×4 lengths of lumber to form each A-frame of the gym set and either a long 4×4 or two parallel 2×6 boards to form the cross beam depending upon the length of the cross beam. If the cross beam is especially long, it may also be supported by a third A-frame positioned midway along the cross beam.

Although wood play gyms look very strong and sturdy, it is a fact that play gyms with wood cross beams are not as strong as those with a tubular metal cross beam. Therefore, there is a demand for a play gym having a tubular metal cross beam for strength and A-frames of wood to give the gym set the rustic, rugged appearance prized by some consumers. The trouble is that the existing hardware for connecting wooden A-frames to a tubular metal cross beam is quite different from that used to secure those A-flames to a wooden cross beam. This is due not only to the different materials involved, but also to the different problems involved in mating flat and curved surfaces. As a result, manufacturers are required to supply different hardware kits for assembling those different types of play gyms. Obviously, the cost involved in handling and inventorying these different parts with similar functions increases the overall cost of such gym sets and kits.

SUMMARY OF THE INVENTION

Accordingly, it is an object of the present invention to provide a children's play gym with wood legs and either a tubular metal or wood cross beam.

Another object of the invention is to provide such a play gym whose wood cross beam may comprise a single 2×4 beam or two parallel 2×6 timbers.

Another object is to provide a hardware kit for constructing a play gym with wood legs and either a tubular metal or wood cross beam.

A further object of the invention is to provide a hardware kit for constructing a play gym having a cross beam supported by wood A-frames which achieves an especially strong connection between the cross beam and the A-frames.

Yet another object of the invention is to provide a hardware kit for constructing a play gym having wood legs which is relatively inexpensive to manufacture.

Still another object of the invention is to provide a kit of this general type which achieves an especially strong and reliable connection between the play gym legs and the cross beam supported by the legs.

Other objects will, in part, be obvious, and will, in part, appear hereinafter. The invention accordingly comprises the features of construction, combination of elements and arrangement of parts which will be exemplified in the following detailed description, and the scope of the invention will be indicated in the claims.

Briefly, our play gym includes a cross bar which may consist of a metal pipe or one or more wood beams. The opposite ends of the cross beam are supported by a pair of wood A-frames each of which is connected to the cross beam by a metal bracket and a metal brace. Depending upon its length, the cross beam may be supported by additional similar A-frames positioned intermediate the cross beam ends. Swings and other rides are suspended from the cross beam at various locations along the beam.

Each A-frame is composed of a pair of wood legs, e.g., 3×3 or 4×4 planks whose ends may be squared off. The two legs of each A-frame are splayed out and the upper ends of the legs are rigidly connected together by a metal frame bracket anchored to the legs by fasteners such as nails, screws or bolts. The legs of each A-frame are also connected together midway along their lengths by a cross member which may be of metal or wood. Each frame bracket also has an integral lateral flange for connecting the corresponding A-frame to the cross beam. That flange includes at least one bolt hole which is placed in register with a corresponding vertical passage in the cross beam so that a bolt can be inserted through the flange and passage and be anchored by a nut threaded onto the bolt.

In order to further rigidify the structure, a special frame brace is anchored to the top of each A-frame and to the cross beam. This brace is arranged and adapted to accommodate all of the members customarily used to form the cross beam of a play gym, e.g., a metal tube or pipe, a 3×3 or 4×4 beam or two back-to-back 2×6 beams. As will be described in more detail later, each frame brace consists of a stamped metal part having a triangular profile and an inverted U-shaped cross section. A short leg of the frame brace has lateral flanges containing holes for receiving threaded fasteners to anchor the frame brace to the tops of the legs comprising an A-frame. The top wall or bridging portion of the frame brace is provided with three different sets of holes for anchoring the frame brace to the three possible types of cross member used for the play gym. The first set comprises at least two holes spaced apart along the frame brace centerline for registering with vertical holes in a tubular metal cross member. Bolts inserted through these openings in the frame brace and cross member and anchored in place by nuts threaded onto the ends of the bolts anchor the frame brace to the tubular metal cross member. Preferably, the underside of the tubular metal cross beam is flattened in the region of the A-frame to provide a seat for the A-frame and frame bracket.

The first set of holes in the bridging portion of the frame brace is also used when the cross member of the play gym comprises a single wood member such as a 3×3 or a 4×4 beam. These holes are arranged to register with vertical passages in the wood cross beam and to receive bolts for anchoring the frame brace to the cross beam. In this case however, the second set of holes in the bridging portion of the frame brace is used to hold the frame brace against the wood cross beam so that the brace can function as a templet for drilling the holes in the cross beam that will register with the first set of holes in the frame brace. There should be at least two holes in the second set of holes, one on each side of the frame brace centerline, but preferably, there are at least four such holes distributed on each side of that centerline more or less midway along the frame brace bridging portion.

The third set of holes in the frame brace is used when the associated play gym has a cross beam composed of two parallel 2×6 beams arranged on edge side by side. The holes in the third set are also displaced laterally from the frame brace centerline. Preferably, there are at least four such holes located near the four corners of the frame brace bridging portion. These holes are arranged to register with vertical holes present in the associated 2×6 boards comprising the cross beam. That is, the two holes on one side of the frame brace centerline register with vertical passages drilled in one 2×6 beam, while the two holes on the opposite side of the frame brace centerline register with two holes drilled in the other 2×6 beam. Bolts received in these registering openings and anchored in place by appropriate nuts threaded onto the ends of the bolts firmly anchor the frame brace to the two 2×6 boards comprising the cross beam.

To facilitate drilling the holes in the 2×6 boards, the second set of holes described above may be used to "tack" the frame brace to the 2×6 boards so that the frame brace bridging portion can function as a drilling templet.

When the frame brace is bolted thusly to the A-frame and to the cross beam, it functions as a strut to maintain a 90° angle between the cross beam and the A-frame. Also, since the bridging portion of the frame brace is connected to both 2×6 boards comprising the cross beam by both the fasteners extending through the second set of holes and the bolts extending through the third set of holes, the frame brace securely clamps the two 2×6 boards together so that they function more or less as a single monolithic member having maximum strength and resistance to bending forces developed when the play gym is being used.

When our frame bracket and frame brace constitute part of a kit for assembling a play gym, it is obvious from the foregoing that those same parts may be used to connect the wood A-frames to play gym cross beams of at least three entirely different types. This not only simplifies the manufacture of kits of this general type, it also gives the consumer more discretion in the type of gym to be constructed from the kit which he has purchased. Yet, despite its versatility, the kit described herein is not appreciably more expensive to manufacture or difficult to use than prior comparable kits of this general type.

BRIEF DESCRIPTION OF THE DRAWINGS

For a fuller understanding of the nature and objects of the invention, reference should be had to the following detailed description, taken in connection with the accompanying drawings, in which:

FIG. 1A is a fragmentary isometric view illustrating a play gym incorporating our invention;

FIG. 1B is a similar isometric view illustrating a second play gym incorporating our invention;

FIG. 3 is a sectional view taken along line 3—3 of FIG. 1B;

FIG. 4 is a similar view taken along line 4—4 of FIG. 1B, and

DETAILED DESCRIPTION OF ILLUSTRATIVE EMBODIMENTS

Figure 2:
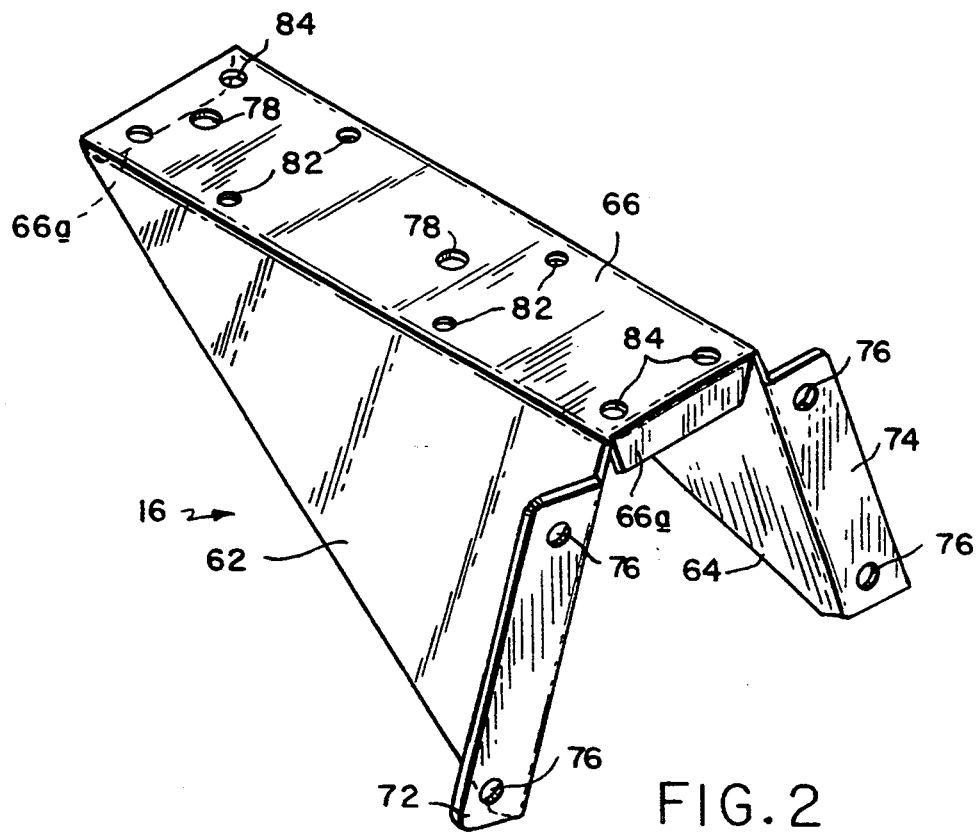
FIG. 2 is an isometric view on a much larger scale showing the frame brace component of the kit used to assemble the FIG. 1 play gyms.

Referring to FIG. 1A of the drawings, our improved play gym comprises a cross bar shown generally at 10 supported above the ground by a pair of similar wood A-frames shown generally at 12 positioned at the ends of the cross beam. The upper end of each A-frame is secured to the corresponding end of the cross beam 10 by a metal frame bracket 14 and a metal frame brace 16. Various swing rides shown generally at 18 may be suspended from the cross beam 10.

As shown in FIGS. 1A and 1B, the cross beam 10 may be a tubular metal part, i.e., a pipe 10a, or it may consist of a wood member 10b. The illustrated cross beam 10b is shown to consist of two parallel back-to-back 2×6 planks 20a and 20b. However, it could also be a single wood beam, e.g., a 3×3 or 4×4 board, depending upon the length of the cross beam 10.

It is a feature of the invention that the same frame bracket 14 and frame brace 16 can be used to secure the A-frames 12 to all of these different cross beams to produce a very rigid, rugged structure.

Figure 5:
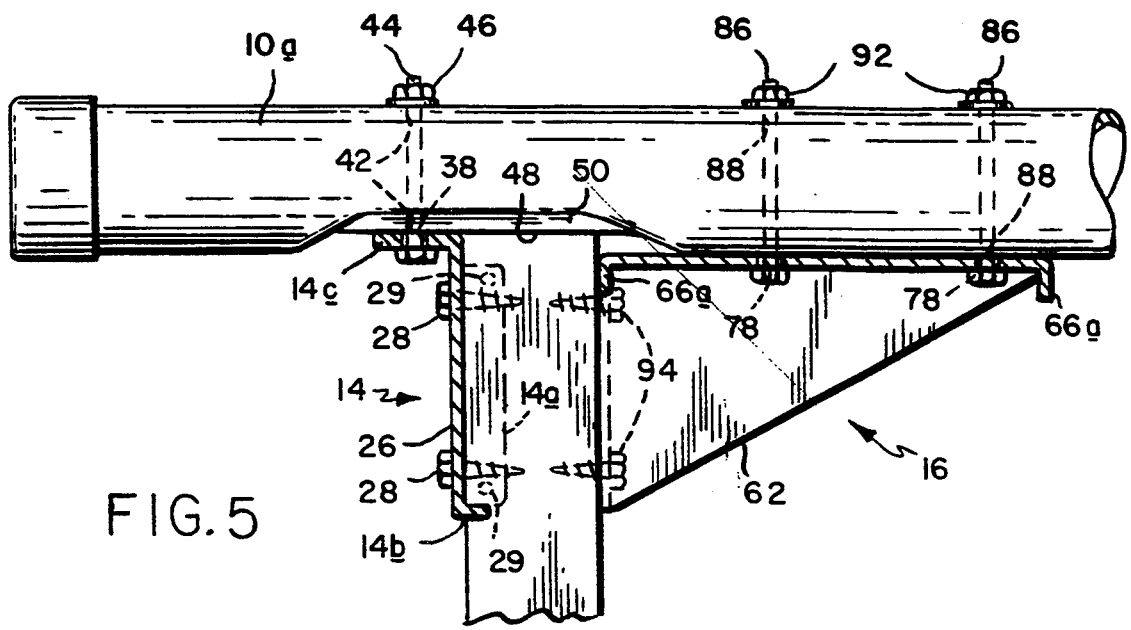
FIG. 5 is a fragmentary sectional view taken along line 5—5 of FIG. 3.

Each A-frame 12 comprises a pair of wood legs 22 and 24, preferably consisting of 3×3 or 4×4 planks having squared off ends. The lower ends of legs 22 and 24 are spread apart as shown and the leg upper ends are connected together by frame bracket 14. As shown in FIGS. 1A, 1B and 5, bracket 14 is a generally trapezoidal stamped metal plate having a plurality of holes 26 through which fasteners 28 may be inserted to anchor the frame bracket to the legs 22 and 24. These fasteners may be nails, screws or bolts. Each frame bracket 14 preferably also includes side flanges 14a which wrap around the A-frame legs 22 and 24 and an inwardly turned bottom flange 14b between the legs. These flanges rigidify the frame bracket and function as guides to assure proper placement of the legs 22 and 24. Flanges 14a may also have holes 29 for receiving additional fasteners 28.

The A-frame legs 22 and 24 are also connected together midway along their lengths by a cross member 32 whose opposite ends are secured to the legs 22 and 24 by appropriate fasteners 34. When the play gym has a tubular metal cross member 10a, the cross member 32 preferably consists of a metal tube with flattened ends as shown at the left side of FIG. 1A. On the other hand, when the play gym cross beam 10 is of wood, the A-frame cross member 32 may also be of wood as shown at 32' at the right side of FIG. 1B. Of course, the metal and wood cross members 32 and 32' may be used interchangeably depending upon consumer demand.

As best seen in FIGS. 1A, 1B and 5, each frame bracket 14 also has an integral, outwardly extending trapezoidal flange 14c for engaging under cross beam 10. A hole 38 is present in that flange. When the cross beam is a metal pipe 10a, the hole 38 is arranged to register with holes 42 in the opposite walls of the pipe so that a bolt 44 can be inserted through those holes and secured in place by a nut 46 turned down onto the threaded end of the bolt.

To provide a stable seat for the A-frame 12 and bracket flange 14c, the underside of the tubular cross beam 10a may be distorted to provide a generally flat surface 48 and two lateral ribs 50 extending out on opposite sides of the cross beam. When the A-frames are assembled to the cross beam as shown in FIGS. 1A, 1B, 3 and 5, the upper ends of legs 22 and 24 butt against these ribs 50 to help stabilize the play gym.

On the other hand, when the play gym cross member is of wood as shown at the right side of FIG. 1B, the hole 38 is arranged to register with a vertical passage 52 in the beam. The bracket and beam are secured together by a bolt 44' extending through the bracket flange hole 38 and passage 52 and by a nut 46' turned down on the bolt. Preferably, a large washer 58 is provided on wood beam 10b at the upper end of each passage 52 to prevent the associated bolt from pulling back through the beam in response to forces exerted on the bolt when the play gym is in use.

Referring now to FIGS. 2 to 5, the frame brace 16 is an elongated stamped metal part with an inverted U-shaped cross section. It has a pair of generally triangular side walls 62 and 64 which are connected together at their long upper edges by a generally rectangular bridging portion or wall 66. The side walls are spaced further apart at their lower edges than at top wall 66 so that they are inclined or sloped at about the same angle as the side edges of each frame bracket 14, i.e., 15°–25°. End flanges 66a extend down from portion 66 to rigidify that portion. The short end legs of the side walls 62 and 64 have a pair of generally rectangular integral flanges 72 and 74 which extend laterally in opposite directions from the frame brace. Holes 76 are present adjacent to the upper and lower ends of each flange.

Holes are also formed in the bridging portion 66 of the frame brace. More particularly, there is a first set of relatively large bolt holes 78 spaced apart along the longitudinal centerline of bridging portion 66, one such hole being located near the middle of portion 66 and another hole being located near the end of that portion remote from flanges 72 and 74. There should be at least two holes in this first set.

The frame brace bridging portion also has a second set of smaller holes 82 positioned on opposite sides of the frame brace centerline. There should be at least two and preferably four such holes, two on each side of the frame brace centerline and spaced apart along the frame brace bridging portion. These holes should be large enough to receive a fastener such as a nail or screw.

There is also a third set of holes 84 in the frame brace bridging portion also displaced laterally on opposite sides of the frame brace centerline. Preferably, there are least four such holes, two on each side of the frame brace centerline and spaced along the frame brace, e.g., near the four corners of the frame brace bridging portion. These holes 84 should be large enough to receive relatively large bolts.

The first set of holes 78 is used when the play gym has a tubular metal cross beam such as the cross beam 10a depicted in FIGS. 1A, 3 and 5. These holes 78 may also be used when the play gym has a cross beam consisting of a single wood member such as a 4×4 beam. Bolts 86 are inserted through the holes 78 and through registering holes 88 in the opposite walls of the tubular cross beam 10a and are secured in place by nuts 92 turned down on the threaded ends of the bolts. The frame brace is also secured to the legs 22 and 24 of the associated A-frame 12 by threaded fasteners 94 inserted through the flange holes 76 and screwed into the legs.

When the cross beam 10 consists of a single wood member, the holes 78 in the frame brace bridging portion are arranged to register with vertical holes drilled in the wood cross beam. To facilitate drilling those holes at the proper locations on the cross beam, the second set of holes 82 in the frame brace may be used to hold the frame brace bridging portion against the cross beam so that the frame brace can be used as a templet for drilling the holes 78 in the cross beam. Simple fasteners 96 (FIG. 4) such as nails or screws may be used for this purpose, being inserted through the holes 82 into the underside of the wood cross member.

After the frame bracket 14 and frame brace 16 have been secured to the cross beam, the legs 22 and 24 of each A-frame 12 may be slid into place between frame bracket and the frame brace until the ends of those legs butt against the ribs 50 if the cross member is a metal tube or against the lower corners of the cross beam if the cross beam is of wood. During this process of installing the legs 22 and 24, the flanges 14a, 14b of the frame bracket and the flanges 72, 74 of the frame brace automatically position the legs in the correct angular relationship. Once those legs are seated against the cross beam, they may be secured in place by installing the fasteners 28 through the holes 26 and 29 in the frame bracket and the fasteners 94 through the holes 76 in the frame brace flanges 72 and 74. When the A-frames 12 are assembled thusly to the cross beam 10, each frame brace functions as a very rigid strut which, in combination with the frame bracket 14, maintains the right angle relationship of the cross beam and A-frames even when the play gym is subjected to strong lateral and racking forces when the play gym is in use.

Referring now to FIGS. 1B and 4, the third set of holes 84 is used when the play gym cross beam comprises a pair of parallel beams such as the 2×6 planks 20a and 20b at the right side of FIG. 1B. These holes are arranged to register with vertical holes 98 drilled in the two planks 20a and 20b. To ensure proper placement of those holes 98, the second set of holes 82 may be used to receive the fasteners 96 to "tack" the frame brace to the undersides of the two beams 20a and 20b after those beams have been nailed together back-to-back. The frame brace thus functions as a drilling templet for the holes 98 with planks. The frame brace is anchored permanently to the beams 20a and 20b by bolts 102 passed through the holes 84 and 98 and secured in place by nuts 104 turned down onto the threaded ends of those bolts. Preferably, large washers 106 are positioned on the planks 20a and 20b at the holes 98 to prevent the bolts from pulling back through the holes 98 because of the forces developed when the play gym is in use.

It is important to note that when the play gym cross beam comprises twin planks as depicted at the right side of FIG. 1B, the two frame braces 16 function not only as struts between the cross beam and the A-frames 12, but also as tie straps to hold the two beams 20a and 20b together. This is important because in the twin-plank-cross beam version of the play gym, the bolts 44' securing the frame brackets 14 to the cross beam extend through passages in the cross beam which are located right at the opposing faces of the two beams 20a and 20b. Therefore, when the play gym is in use, forces are transmitted to those bolts which tend to spread apart the two beams 20a and 20b. However, the frame braces 16 described herein prevent that from happening. Thus, for that play gym design, the frame braces 16 have three functions. First, they constitute templets to facilitate drilling the holes in the wood cross beam 10. Secondly, they constitute rigidifying struts between the cross beam and the A-frames 12. Thirdly, they function as tie straps to prevent the two planks 20a and 20b from being spread apart so that the two planks function as a single monolithic member.

As shown in FIGS. 1A and 1B, the swings 18 suspended from cross beam 10 may hang from eye bolts 110 extending through vertical holes (not shown) in the cross beam and anchored by nuts 111 turned down on the bolts. If the cross beam is of wood, large washers or plates 112 may be positioned on top of the beam to prevent the bolts from pulling back through the beam. Also, if the cross beam consists of twin planks 20a and 20b, those washers or plates may be provided with holes 114 through which fasteners 116 can be driven into the two planks 20a and 20b so that those washers or plates also function as tie straps for holding the two planks together at those locations.

The play gyms described herein can be sold as complete units or they may be marketed as kits containing all of the parts required to make a particular gym set, except for the wood parts thereof, with the bolts being tailored to the particular gym set. For example, the bolts 44 and 86 that connect the frame bracket 14 and frame brace 16 to the cross beam 10a may be shorter than bolts 44' and 102 required to connect the bracket and brace to a wood cross beam. Alternatively, all of the parts required to make all of the play gym versions described herein may be sold in a single kit so that the consumer can decide which type of gym set he wants to make after purchasing the kit. Then, after assembling the gym, he may discard the unused parts.

It will be appreciated from the foregoing that our improved play gym and kit for assembling same have great versatility in that several different play gym types may be constructed using essentially the same parts. Yet, the costs of making the play gym and kit are no more than the costs of prior comparable gym sets and kits of this general type. Therefore, the present play gym and kit for assembling same should find wide acceptance in the marketplace.

It will thus be seen that the objects set forth above, among those made apparent from the preceding description, are efficiently attained and, since certain changes may be made in the above constructions without departing from the scope of the invention, it is intended that all matter contained in the above description be interpreted as illustrative and not in a limiting sense.

It is also to be understood that the following claims are intended to cover all of the generic and specific features of the invention described herein.

We claim:

1. A children's play gym comprising
   a cross beam consisting of at least one member;
   wood legs forming at least one A-frame to support the cross beam
   a rigid frame bracket having inclined side edges;
   fasteners extending through the frame bracket and into said crossbeam and said legs for securing the legs to each other to form the A-frame and for connecting the A-frame to the cross beam;
   a rigid frame brace positioned at the inside corner between said crossbeam and said A-frame, said frame brace including
      a top wall for engaging the underside of the cross beam, said top wall having first portions defining a first set of holes spaced apart along the longitudinal centerline of the top wall, there being at least two holes in the first set and second portions defining a second set of holes, said second set containing at least two holes spaced along the top wall on each side of said centerline,
      a pair of laterally spaced apart inclined side walls extending down from the top wall with substantially the same slope as the side edges of the frame bracket, and
      a pair of flanges extending laterally from said side walls at one end of the frame brace, said flanges having portions defining openings for receiving fasteners;
   first fastener means extending through selected ones of said openings into said legs to secure said flanges flat against said legs, and
   second fastener means extending through the first set of holes into the crossbeam when the crossbeam is a single member and extending through the second set of holes into the crossbeam when the crossbeam consists of a plurality of members so that the frame brace braces the inside corner between the crossbeam and the A-frame.

2. The children's play gym defined in claim 1 wherein said top wall is generally rectangular, and
   said side walls are generally triangular giving the frame brace a triangular profile and a generally inverted U-shaped cross section.

3. The children's play gym defined in claim 2 wherein the top wall of the frame brace has third portions defining a third set of holes containing at least two holes spaced along the top wall on each side of said centerline and being displaced from the second set of holes.

4. The children's play gym defined in claim 3 wherein the holes in the first and second sets of holes are larger than the holes in the third set of holes.

5. The children's play gym defined in claim 2 wherein the holes in the second set are located adjacent to the four corners of the frame brace top wall.

6. The children's play gym defined in claim 2 wherein the frame brace also includes flanges extending down from the opposite ends of the frame brace top wall between the frame brace side walls.

7. A children's play gym comprising
   a longitudinal wood or metal cross beam consisting of at least one member;
   a pair of upstanding A-frames positioned under the opposite ends of the cross beam, each A-frame including
      a pair of wood legs, and
      connecting means for connecting the upper ends of the legs to each other and to the adjacent end of the cross beam;
   a pair of elongated frame braces for reinforcing the connections of the A-frames to the cross beam, each frame brace including
      a pair of spaced-apart side walls having relatively long top edges and shorter end edges at one end of the frame brace, a generally rectangular top wall connecting the top edges of the side walls, a pair of laterally extending flanges extending from said side wall end edges, said flanges being shorter than said side wall end edges, a first set of holes in the top wall spaced along the longitudinal centerline of the top wall, there being at least two holes in the first set, and a second set of holes in the top wall, said second set containing at least two holes spaced along the top wall on each side of said centerline;

securing means for securing the frame brace flanges flat against the A-frames, and fastener means extending through the first set of holes into the cross beam when the cross beam is a single member and extending through the second set of holes into the cross beam when the cross beam consists of a plurality of members so that the frame braces brace the inside corners between the cross beam and the A-frame.

8. The play gym defined in claim 7 and further including a third set of holes in the frame brace top wall, said third set containing at least two holes spaced along the top wall on each side of said centerline and being displaced from said second set of holes, and fasteners extending through the third set of holes into the cross beam when the cross beam is of wood.

9. The play gym defined in claim 8 wherein the holes in the first and second sets are larger than the holes in the third set.

10. The play gym defined in claim 7 wherein the connecting means each include a metal bracket having a main body which has an upper edge and sloped side edges and is positioned flat against the A-frame legs and a flange extending from said upper edge and engaging under the cross beam, and fasteners for fastening the main body and flange to the A-frame legs and cross beam, respectively.

11. The play gym defined in claim 10 wherein the side walls of the frame brace have substantially the same slope as the side edges of the frame bracket main body.

12. The play gym defined in claim 7 wherein the cross beam comprises a metal tube, said tube having portions defining flats in the underside of the tube at the locations of said A-frames which provide seats for said legs.

13. The play gym defined in claim 12 and further including laterally extending ribs formed in said tube on opposite sides of said flats.

14. The play gym defined in claim 7 wherein the cross beam is composed of a pair of back-to-back wood beams each having a generally rectangular cross section.

15. The play gym defined in claim 7 wherein the cross beam is a single wood beam having a generally square cross section.

* * * * *